A. VOGELSANG.
Assignor to the VOGELSANG SCREW PROPELLER COMPANY.
SCREW PROPELLER.
No. 10,997. Reissued Apr. 23, 1889.
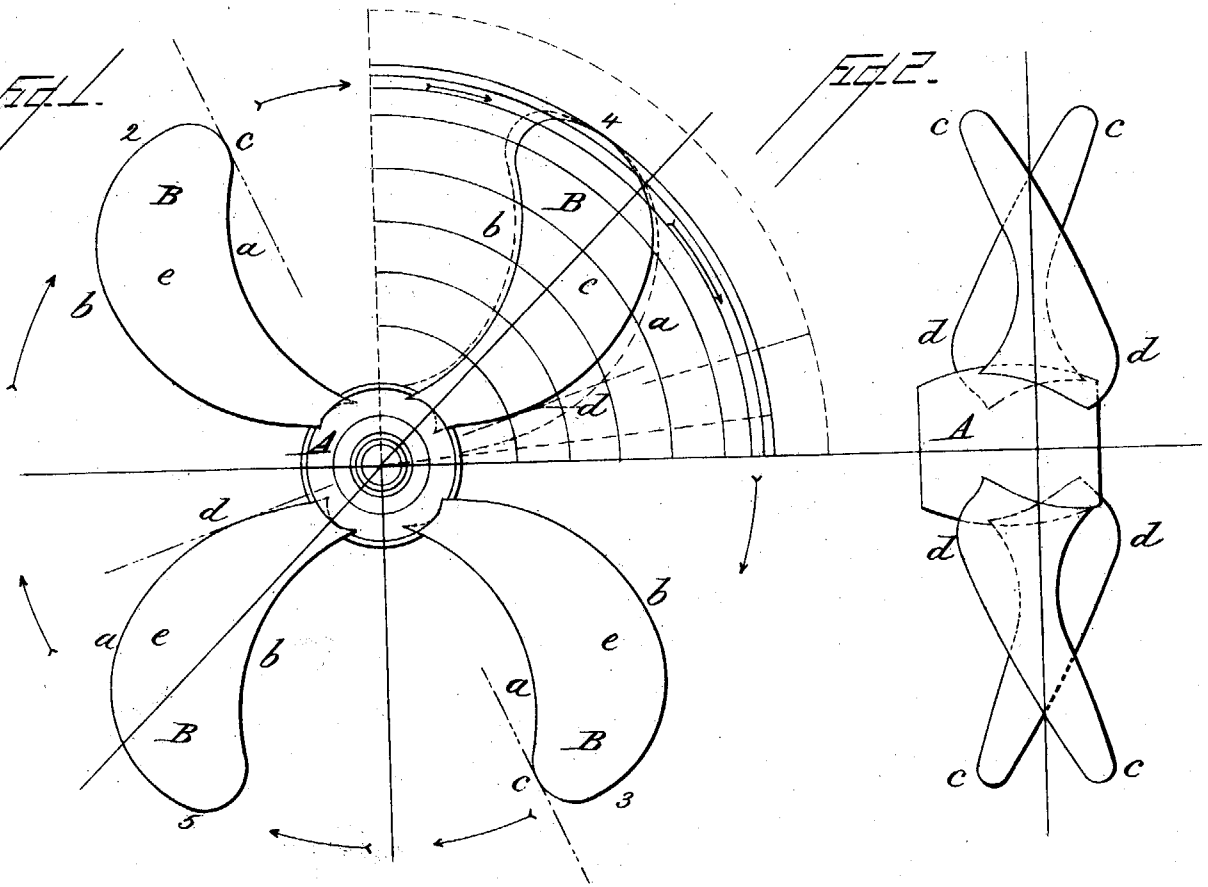
Witnesses
H. H. Schott
W. Burris
Inventor
Alexander Vogelsang
By his Attorneys
Johnston, Reindel & Dyer
N. PETERS, Photo-Lithographer, Washington, D. C.

UNITED STATES PATENT OFFICE.

ALEXANDER VOGELSANG, OF BROOKLYN, NEW YORK, ASSIGNOR TO THE VOGELSANG SCREW PROPELLER COMPANY, OF SAME PLACE.

SCREW-PROPELLER.

SPECIFICATION forming part of Reissued Letters Patent No. 10,997, dated April 23, 1889.

Original No. 381,193, dated April 17, 1888. Application for reissue filed February 15, 1889. Serial No. 300,050. Patented in England November 4, 1887, No. 15,055; in France November 9, 1887, No. 186,880, and in Belgium November 9, 1887, No. 79,470.

*To all whom it may concern:*

Be it known that I, ALEXANDER VOGELSANG, a citizen of the United States, residing at Brooklyn, in the county of Kings and State of New York, have invented certain new and useful Improvements in Propellers; and I do hereby declare the following to be a full, clear, and exact description of the invention, such as will enable others skilled in the art to which it appertains to make and use the same.

My invention (which has been patented in England November 4, 1887, No. 15,055; in France November 9, 1887, No. 186,880, and in Belgium November 9, 1887, No. 79,470) relates to screw-propellers, and has for its object an improvement on my propeller patented April 5, 1887, No. 360,833.

In the further development of my invention by practical demonstration on seagoing vessels I have discovered that better results are obtained from a screw-propeller in which the leading part of each blade rotates in advance of the next preceding blade (in the direction of progression) in the same radius than from a screw-propeller in which the leading part of each alternate blade only rotates in advance of the part of the next preceding blade in the same radius.

The invention will be hereinafter described, and particularly pointed out in the claims.

In the accompanying drawings, which form a part of this specification, Figure 1 is an end view of my improved propeller with the lines of construction drawn on one blade, and Fig. 2 is an elevation or side view showing the relation of the leading part of one blade to the others and the overlapping and crossing of two adjacent blades.

Reference being had to the drawings and the letters thereon, A represents the hub, from which radiates a series of blades, B, which may be disposed equidistant around the hub in pairs arranged diametrically opposite to each other, as shown at 2 3 and 4 5 in Fig. 1; or they may be grouped in pairs, as in my former patent. The cutting or entering edge of each blade is indicated by the letter *a* and the trailing or leaving edge by *b*, while the leading or advanced part of each blade is indicated by the letters *c d*. The leading part *c*, which is near the circumference or periphery of the blade, rotates in advance of the part of the preceding blade in the same radius, and the leading part *d*, which is nearer the hub of the blade, rotates in advance of the preceding blade in a corresponding radius. The blades, which are diametrically opposite to each other on the hub, have their cutting or entering and their trailing or leaving edges made to conform to each other.

The contour of one of the edges of each blade may be composed of lines radiating from different centers, or right lines and curved lines combined, and the opposite edge of each blade may be in the form of an ogee or cyma; or both may be curved lines struck from one center and reaching from the end of the blade to the root of the blade; or the lines may be angular where they radiate from the hub and intersect a curved line from the end of the blade. The principal feature in the construction is that the leading parts *c* or *d* of two succeeding blades are situated at different distances from the center of the screw—that is, the leading part of one blade is near the circumference or periphery of the blade, as shown at *c*, and the leading part *d* of the next preceding blade is near the hub; but the leading part of each blade should always rotate in a plane of projection that is in advance of the next preceding blade in the same radius and in the direction in which the vessel is moving.

In the propeller shown in my former patent the leading part of each alternate blade only rotated in advance of the intermediate blade; or, in other words, the blades having their leading parts near the circumference or periphery are in advance of the next preceding blade in the same radius, while the leading parts of the cutting-edges which are near the hub on the next preceding blades rotated in the same plane.

The roots of the blades are disposed upon the hub at an angle to the longitudinal axis of the hub, and the centers of the workingsurfaces of each pair of blades are curved in opposite directions, while the centers of the blades which radiate at right angles through the axis of the screw preferably cut the blades, so that the major portion of the blade area is on the convex side or trailing side of one pair of blades and the convex side or cutting side of the opposite pair of blades, as shown at *e* on each blade.

The pitch of the blades may be uniform from the hub to the periphery or ends of the blades, or it may be of an expanding or increasing but preferably of a variable pitch, or the blades may be flat and set at a suitable angle to the shaft; but in either construction either all of the blades must be right or all left screws.

Each blade overlaps and crosses the plane of rotation of the adjacent blade of the next pair of blades, as shown in Fig. 2.

The construction lines and the dotted lines showing the development of the blade are well understood and require no description in detail.

By the construction shown each blade presents a leading part in advance of the preceding blade in the same radius in the direction of progression, so that the same advantage is obtained in either direction in which the screw may be revolving, and in the revolution of the screw no blade of the series enters the water which has been disturbed by the preceding blade, but cuts into quiet water. Instead of forming the blades integral with the hub, as shown, they may be made separate therefrom and be attached to the hub in any approved manner.

Having thus fully described my invention, what I claim is—

1. A propeller in which the leading part of each blade rotates in a plane in advance of the part of the next preceding blade in the same radius and in the direction of progression of the screw, substantially as described.

2. A propeller in which the leading parts of two successive blades are situated at different distances from the hub in a plane that is normal to the axis of the propeller-shaft, the blades diametrically opposite each other are alike, and the leading part of each blade rotates in a plane in advance of the part of the next preceding blade in the same radius and in the direction of progression of the screw, substantially as described.

London, February 2, 1889.

ALEXANDER VOGELSANG.

In presence of—
MARTIN B. WALLER,
C. M. BURGESS.